(12) United States Patent
Retana et al.

(10) Patent No.: US 11,374,848 B2
(45) Date of Patent: Jun. 28, 2022

(54) EXPLICIT ROUTING WITH NETWORK FUNCTION ENCODING

(71) Applicant: Huawei Technologies Co., Ltd., Guangdong (CN)

(72) Inventors: Alvaro Retana, Raleigh, NC (US); Renwei Li, Sunnyvale, CA (US); Yingzhen Qu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 17/080,447

(22) Filed: Oct. 26, 2020

(65) Prior Publication Data
US 2021/0243107 A1    Aug. 5, 2021

Related U.S. Application Data

(63) Continuation of application No. PCT/CN2019/082207, filed on Apr. 11, 2019.
(Continued)

(51) Int. Cl.
*H04L 45/02* (2022.01)
*H04L 45/42* (2022.01)
(Continued)

(52) U.S. Cl.
CPC ............. *H04L 45/02* (2013.01); *H04L 45/04* (2013.01); *H04L 45/34* (2013.01); *H04L 45/42* (2013.01); *H04L 45/64* (2013.01); *H04L 2212/00* (2013.01)

(58) Field of Classification Search
CPC ......... H04L 45/02; H04L 45/04; H04L 45/34; H04L 45/42; H04L 45/64
See application file for complete search history.

(56) References Cited

U.S. PATENT DOCUMENTS

2012/0243539 A1* 9/2012 Keesara ................. H04L 45/66
370/392
2013/0070745 A1* 3/2013 Nixon .................... H04W 84/02
370/328
(Continued)

FOREIGN PATENT DOCUMENTS

| CN | 105337785 A | 2/2016 |
| CN | 107579838 A | 1/2018 |
| WO | WO-2019210769 A1 | 11/2019 |

OTHER PUBLICATIONS

"International Application No. PCT/CN2019/082207, International Search Report and Written Opinion dated Jul. 11, 2019", (dated Jul. 11, 2019), 7 pgs.
(Continued)

*Primary Examiner* — Min Jung
(74) *Attorney, Agent, or Firm* — Schwegman Lundberg & Woessner, P.A.

(57) ABSTRACT

A method of routing a data packet through a network comprises updating at least one router local forwarding table to include path IDs of network segments defining paths between network nodes and network function bit encoding/decoding information. In response to a data packet arriving at an ingress network node, an encapsulation header including a path ID identifying at least one network segment of an explicit routing path and a bit encoding specifying network functions to be performed on the data packet are encapsulated in unused portions of the source address and/or the destination address in the encapsulation header. A network node in the explicit routing path performs a network function encoded in the source address and/or the destination address of the encapsulation header of the data packet and forwards the data packet based on network function bit encoding/decoding and path ID information in the network node's local updated local forwarding table.

20 Claims, 14 Drawing Sheets

Related U.S. Application Data

(60) Provisional application No. 62/666,568, filed on May 3, 2018, provisional application No. 62/667,358, filed on May 4, 2018, provisional application No. 62/758,254, filed on Nov. 9, 2018.

(51) Int. Cl.
  *H04L 45/00*   (2022.01)
  *H04L 45/64*   (2022.01)

(56) References Cited

U.S. PATENT DOCUMENTS

| | | |
|---|---|---|
| 2016/0099864 A1 | 4/2016 | Akiya et al. |
| 2017/0237656 A1 | 8/2017 | Gage |
| 2018/0102965 A1* | 4/2018 | Hari ............... H04L 12/185 |
| 2019/0182155 A1* | 6/2019 | Chang ............. H04L 45/741 |
| 2019/0394115 A1* | 12/2019 | Li ................. H04L 41/0893 |
| 2020/0136960 A1* | 4/2020 | Jeuk ............... H04L 47/2408 |
| 2020/0296025 A1* | 9/2020 | Wang .............. H04L 12/4633 |

OTHER PUBLICATIONS

Filsfils, C., et al., "SRv6 Network Programming", Internet Draft, Huawei Technologies, (Feb. 14, 2019), 42 pgs.

\* cited by examiner

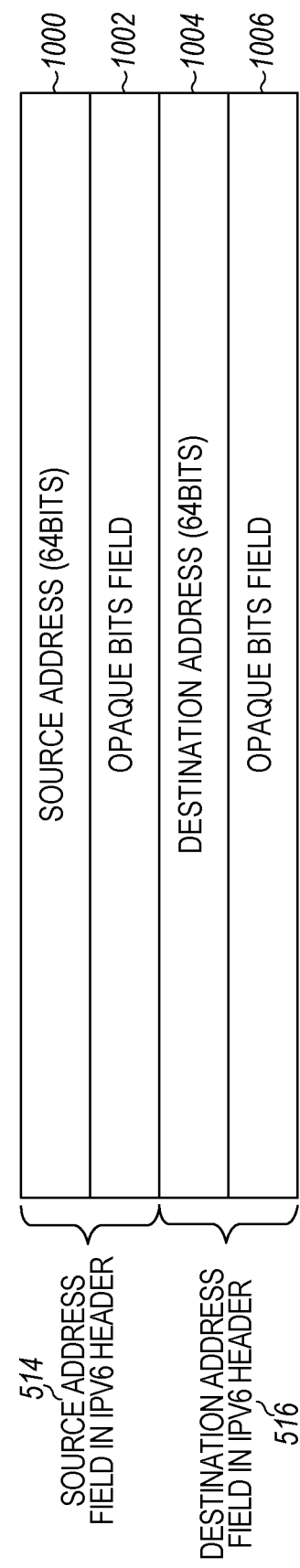

EXPLICIT ROUTING WITH NETWORK FUNCTION ENCODING

CROSS-REFERENCE TO RELATED APPLICATIONS

This application is a continuation application of International Application No. PCT/CN2019/082207, filed Apr. 11, 2019, which claims the benefit of priority to U.S. Provisional Patent Application No. 62/666,568, filed May 3, 2018, by Retana, et al., and titled "Network Function Encoding and Preferred Path Routing," U.S. Provisional Patent Application No. 62/667,358, filed May 4, 2018, by Retana, et al., and titled "Network Function Encoding and Preferred Path Routing," and U.S. Provisional Patent Application No. 62/758,254, filed Nov. 9, 2018, by Retana, et at, and titled "Explicit Routing With Network Function Encoding," which are hereby incorporated by reference in their entireties.

TECHNICAL FIELD

This application is related to communication routing and, in particular, to network function encoding and path routing in a network.

BACKGROUND

In traditional IP network routing, IP packets are forwarded based on a routing table built by routing protocols. The route taken by the IP packets is usually the shortest path calculated by the routing protocols. In segment routing, the source chooses a path and encodes it in the packet header as an ordered list of segments. The rest of the network executes the encoded instructions.

In a multiprotocol label switching (MPLS) data plane, an ordered list of segments is presented as a stack of labels. The MPLS data plane may be reused with no hardware change. In the IPv6 data plane, an ordered list of segments is encoded in a routing extension header; however, new hardware is required.

In SRv6, a Segment Routing IPv6 Header (SRH) is added to an original packet as an IPv6 extension header that may cause the original packet to grow indefinitely. In service function chaining (SFC), the network service header (NSH) and an associated transport encapsulation header are added to the original packet/frame. The IPv6 extension headers and transport encapsulation headers increase the size of the packet, resulting in the potential for the packet to exceed packet size limits. The ability to add headers can also result in security concerns, including privacy for the packets and integrity of the path, since there is an ability to change the packets. Still further, the addition of headers may require enhanced hardware support to process the new headers with minimal impact.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

In sample embodiments, the network service and path information are encoded in unused bits of an unaltered IPv6 header using IP-in-IP encapsulation. The Source Address is used to identify an explicit path ID and service functions at the destination node. Privacy and integrity of the path are obtained by the dynamic and flexible definitions provided for the fields. Interior Gateway Protocol (IGP) flooding or a Software Defined Networking (SDN)-type controller may be used to populate the state information. In sample embodiments, not all network nodes need to maintain the path information and service functions. Instead, only service-aware nodes need to maintain the path information and service functions for the packets to be properly processed as they traverse the network. Moreover, segment routing and service function chaining may be provided without requiring hardware changes.

Embodiments of the systems and methods described herein address packet size growth by encoding the service/path information in unused bits of an unaltered IPv6 header using IP-in-IP encapsulation. To encapsulate an IP packet in another IP packet, an outer header is added with the Source Address as the entry point of the tunnel and the Destination Address as the exit point of the tunnel. In the embodiments described herein, the Source Address is used to identify an explicit path ID and service functions at the destination address. Unused bits in the source and destination addresses are identified and treated as opaque containers to carry the network function encodings. In sample embodiments, a distributed or centralized control plane may be used. IGP Flooding or a software defined network (SDN)-type controller can be used to populate the state information.

According to a first aspect of the present disclosure, there is provided a method of routing a data packet through a network of network nodes. The method includes updating at least one router local forwarding table to include (1) path IDs of network segments defining paths between network nodes of the network and (2) network function bit encoding/decoding information. Then, in response to a data packet arriving at an ingress network node of the network, an encapsulation header is added to the data packet, the encapsulation header including a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path. The path ID of the explicit routing path and the bit encoding for the network functions to be performed on the data packet are encapsulated in unused portions of at least one of the source address and the destination address in the encapsulation header. At least one network node in the explicit routing path performs a network function encoded in at least one of the source address and the destination address of the encapsulation header of the data packet and forwards the data packet based on network function bit encoding/decoding and path ID information in the at least one network node's local updated local forwarding table. When the data packet arrives at an exit network node of the network, the encapsulation header is removed and the data packet is forwarded.

According to a second aspect of the present disclosure, there is provided a network node that routes a data packet through a network of network nodes. The network nodes include at least one transceiver that transmits and receives data packets, a forwarding table comprising path ID information for network segments through the network, a non-transitory memory element comprising instructions, and one or more processors in communication with the at least one transceiver to receive data packets for processing and to the memory to receive instructions for processing the data packets. In sample embodiments, the one or more processors execute the instructions to extract an encapsulation header from the data packet. In the sample embodiments, the encapsulation header includes a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path. The one or more processors also extract the path ID of the explicit routing path and the bit encoding for the network functions to be performed on the data packet from unused portions of at least one of the source address and the destination address in the encapsulation header. When the bit encoding indicates a network function that the network node is programmed to perform, the network node further performs a network function based on the network function bit encoding/decoding encoded in the encapsulation header of the data packet and forwards the data packet based on path ID information in the network node's forwarding table.

According to a third aspect of the present disclosure, there is provided a non-transitory computer-readable media storing computer instructions for routing a data packet through a network of network nodes, that when executed by one or more processors of a network node cause the one or more processors to extract an encapsulation header from the data packet. The encapsulation header includes a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path. The computer instructions, when executed, also cause the one or more processors to extract the path ID of the explicit routing path and the bit encoding for the network functions to be performed on the data packet from unused portions of at least one of the source address and the destination address in the encapsulation header. When the bit encoding indicates a network function that the network node is programmed to perform, instructions are executed to perform a network function based on the network function bit encoding/decoding encoded in the encapsulation header of the data packet and to forward the data packet based on path ID information in a forwarding table of the network node.

In a first implementation of any of the preceding aspects, the bit encoding for the network function to be performed on the data packet is dynamically negotiated and changed between a network controller and network nodes in the network.

In a second implementation of any of the preceding aspects, the bit encoding for the network functions is variable for different network configurations and different user applications.

In a third implementation of any of the preceding aspects, the bit encoding for the network functions changes over time.

In a fourth implementation of any of the preceding aspects, the bit encoding for the network functions varies dependent upon at least one of a location and traffic at a network node in the network.

In a fifth implementation of any of the preceding aspects, the bit encoding of the network functions is scrambled by different algorithms at different network nodes within the network.

In a sixth implementation of any of the preceding aspects, adding the encapsulation header to the data packet comprises storing the path ID of the explicit routing path in unused portions of the network node destination address and storing the network function bit encoding/decoding information in unused portions of the network node source address.

In a seventh implementation of any of the preceding aspects, the path ID uniquely identifies the explicit routing path and further contains at least one flag identifying treatment of the data packet by the network.

In an eighth implementation of any of the preceding aspects, the at least one flag comprises a reroute flag indicating that the data packet has been rerouted by a fast reroute mechanism and an OAM flag identifying the data packet as an operations, administration and maintenance data packet.

In a ninth implementation of any of the preceding aspects, a failure of at least one of a network node and a link between network nodes is detected, the data packet is rerouted by encapsulating at least one of function and reroute information in the path ID, and a reroute flag is set to indicate that the data packet has been rerouted.

In a tenth implementation of any of the preceding aspects, rerouting the data packet by encapsulating at least one of function and reroute information in the path ID comprises adding a layer of encapsulation for the reroute information to the encapsulation header.

In an eleventh implementation of any of the preceding aspects, a network node receives the rerouted data packet, strips the encapsulated at least one of function and reroute information from the data packet, and forwards the data packet according to the encapsulation header.

In a twelfth implementation of any of the preceding aspects, a network node adds a user datagram protocol (UDP) header to a data packet to provide a checksum for data integrity, wherein the checksum in the UDP header is calculated based on the data packet and the encapsulation header.

In a thirteenth implementation of any of the preceding aspects, the at least one network segment of the explicit routing path comprises a network segment that crosses domains, wherein the network node that adds the UDP header to the data packet comprises a network node at an edge of a first domain at a first end of the network segment that crosses domains.

In a fourteenth implementation of any of the preceding aspects, the network segment that crosses domains further comprises a network node at an edge of a second domain at second end of the network segment that crosses domains, further comprising the network node at the edge of the second domain receiving the data packet, verifying the UDP header checksum, and when the checksum is verified, stripping off the UDP header and forwarding the data packet to another network node in the second domain.

In a fifteenth implementation of any of the preceding aspects, the network node at the edge of the second domain discards the data packet when the checksum is not verified.

The method can be performed and the instructions on the computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 9 illustrates encapsulation of an original data packet with a new IPv6 header that contains the path information.

FIG. 10 illustrates modification of the source address field and destination address field in the IPv6 header to include opaque bits fields adapted to store path information and/or encode network service function information in a sample embodiment.

DETAILED DESCRIPTION

It should be understood at the outset that although an illustrative implementation of one or more embodiments are provided below, the disclosed systems and/or methods described with respect to FIGS. 1-19 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 1:
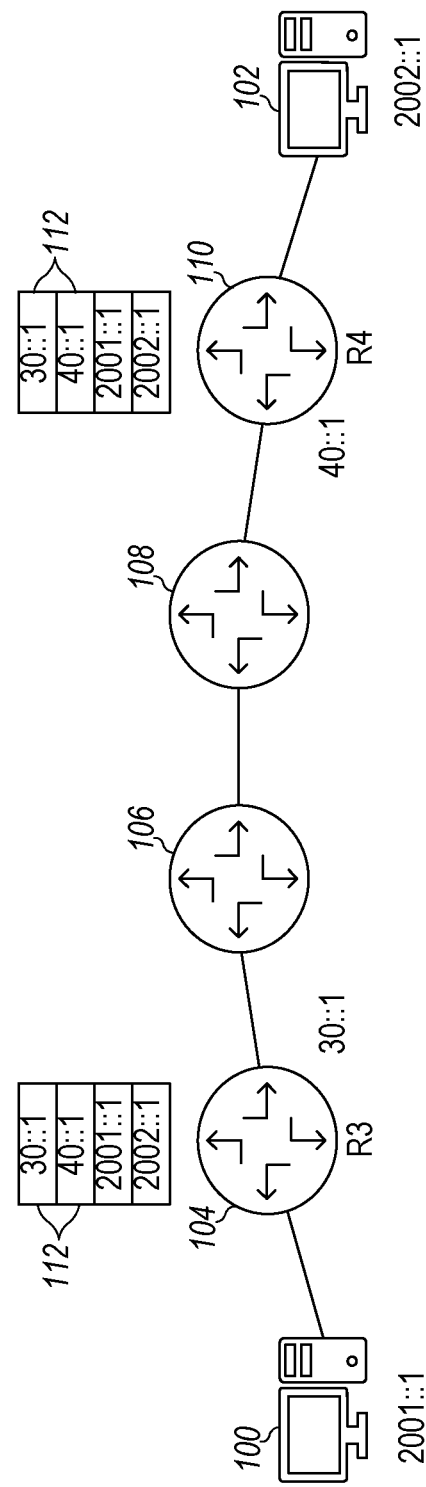
FIG. 1 illustrates a simple example of encapsulation in a network.

FIG. 1 illustrates a simple example of encapsulation in a network between network node 100 having an IPv6-like source address 2001::1 and network node 102 having an IPv6-like destination address 2002::1. If network node 100 wishes to send a packet to network node 102 via the network including network nodes 102, 104, 106, and 108, an edge node R3 (104) encapsulates the original packet with a new encapsulation header 112. In this case, the new source address is 30::1 for edge node R3 (104), and the new destination address is 40::1 for the edge node R4 (110). The network nodes 106 and 108 forward the packet to the destination address 40::1 of edge node R4 (110) based on its address in the encapsulation header 112. Although the 128 bits of both the source and the destination addresses are illustrated as included in the encapsulation header 112, in most cases when a data packet is being forwarded only the network address 40::1 of the destination address is used. However, in some cases, the network address 30::1 of the source address also may be used. As will be explained in more detail below, the systems and methods described herein use unused bits in the source and destination address in the encapsulation header to encode network functions and network routing data.

In traditional network routing, IP packets are forwarded based on a routing table built by routing protocols. Typically, the IP packet is routed via the shortest path calculated by the routing protocols. In segment routing, a network source such as network node 100 in FIG. 1 chooses a path and encodes it in the packet header as an ordered list of segments. The rest of the network nodes extract the segment routing instructions from the packet header and execute the encoded instructions. In a multiprotocol label switching (MPLS) data plane, an ordered list of segments is presented as a stack of labels. Since the MPLS data plane is reused, no hardware change is required for such an implementation. On the other hand, for an IPv6 data plane, an ordered list of segments is encoded in a routing extension header, which requires new hardware.

Figure 2:
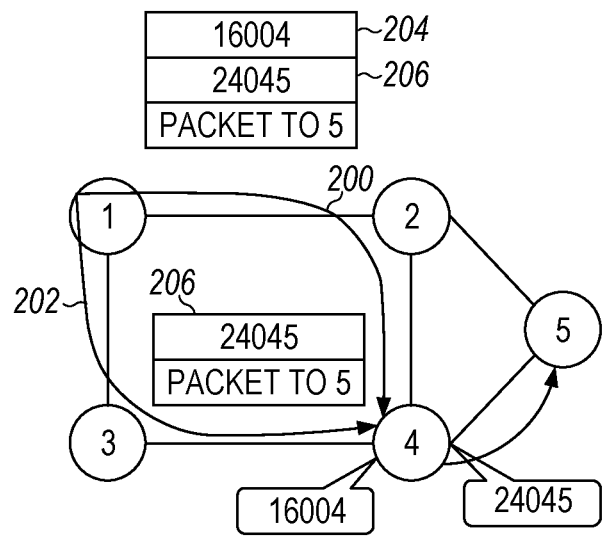
FIG. 2 illustrates a simple example of segment routing.

FIG. 2 illustrates a simple example of segment routing. In this example, for a packet to be routed from node (1) to node (5), the shortest path would be (1)→(2)→(5). Segment routing changes this routing behavior by specifying the segments over which the data is to be routed from node (1) to node (5). In the illustrated example, the segment routing specifies routing from node (1) to node (5) via node (4). In particular, the designated path from node (1) to node (5) is (1)→(4)→(5) via node (2) (200) or via node (3) (202) using label stack 16004 (204) and 24045 (206) specifying the node addresses for nodes (4) and (5), respectively, as indicated. Thus, the segment routing requires the packet to be routed to node (4) first, then to node (5).

Figure 3:
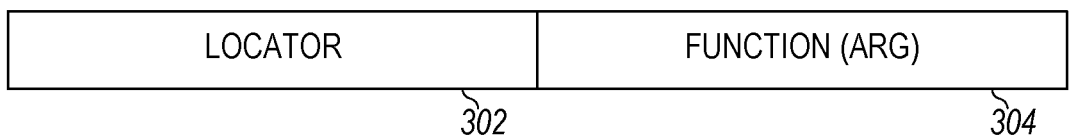
FIG. 3 illustrates a 128-bit segment routing (SRv6) Source ID (IPv6 Destination Address).

Segment routing is defined in more detail in the IETF draft "SRv6 Network Programming" (https://datatracker.iedt.org/doc/draft-filsfils-spring-srv6-network-programming) This document describes how network instructions (functions) are inserted into an IPv6 packet header using a Segment Routing Header (SRH). By way of example, the 128-bit SRv6 SID (IPv6 Destination Address) is structured as illustrated in FIG. 3. As illustrated in FIG. 3, the IPv6 Destination Address 300 includes a locator 302 indicating which node a packet is to be routed to in order to perform the function 304. The function may be any possible function having any optional argument. Generally, the IPv6 Destination Address 300 is fixed but the locator 302 and the function 304 may have flexible bit-lengths.

Figure 4:
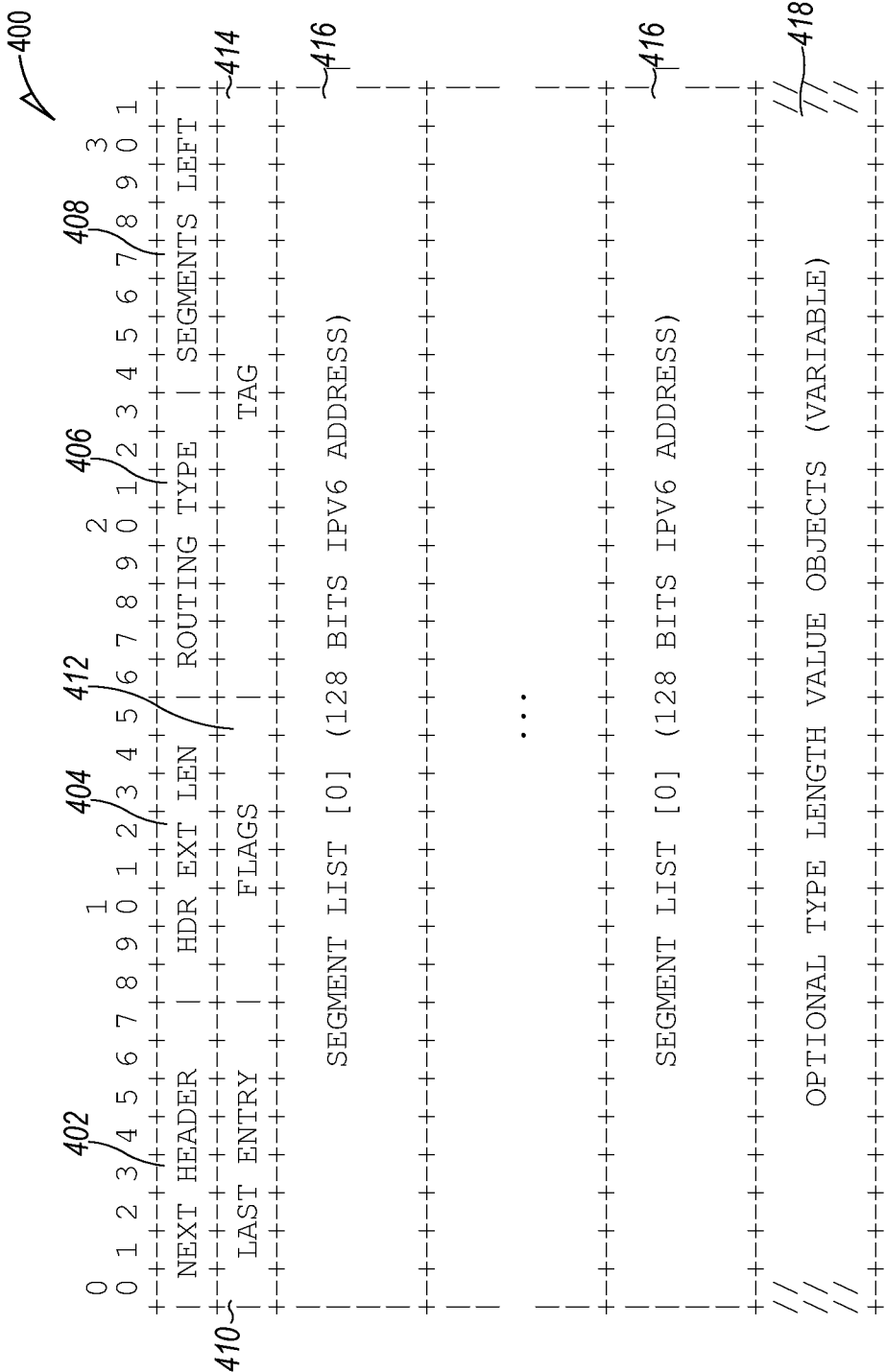
FIG. 4 illustrates an SRv6 extension header.

The SRv6 extension header 400 is illustrated in FIG. 4. As illustrated, the SRv6 extension header 400 includes a number of fields that increase the size of the data packet. In particular, the SRv6 extension header 400 includes a Next Header field 402 that functions as an 8-bit selector that identifies the type of header immediately following the SRH 400. Header Extension Length field 404 includes an 8-bit unsigned integer that specifies the length of the SRH header in 8-octet units, not including the first 8 octets. Routing Type field 406 includes a value specifying the type of routing, while Segments Left field 408 is defined in [RFC2460] and contains the index in the Segment List of the next segment to inspect. The Segments Left value is decremented at each segment. The Last Entry field 410 contains the index of the last element of the Segment List. The Flags field 412 contains 8 bits of flags including:

U: Unused and for future use. SHOULD be unset on transmission and MUST be ignored on receipt.

P-flag: Protected flag that is set when the packet has been rerouted through a Fast ReRoute (FRR) mechanism by a segment routing endpoint node.

O-flag: OAM flag that, when set, indicates that this packet is an operations and management (OAM) packet.

A-flag: Alert flag that, if present, means important Type Length Value (TLV) objects are present.

H-flag: A hash message authentication code (HMAC) flag that, if set, indicates that the HMAC TLV is present and is encoded as the last TLV of the SRH. In other words, the last 36 octets of the SRH represent the HMAC information.

The Tag field 414 tags a packet as part of a class or group of packets, e.g., packets sharing the same set of properties. The Segment List[n] field 416 includes 128-bit IPv6 addresses representing the nth segment in the Segment List. The Segment List is encoded starting from the last segment of the path. In other words, the first element of the segment list (Segment List [0]) contains the last segment of the path, the second element contains the penultimate segment of the path and so on. Finally, the optional Type Length Value (TLV) objects field 418 includes variable length TLV objects.

Figure 5:
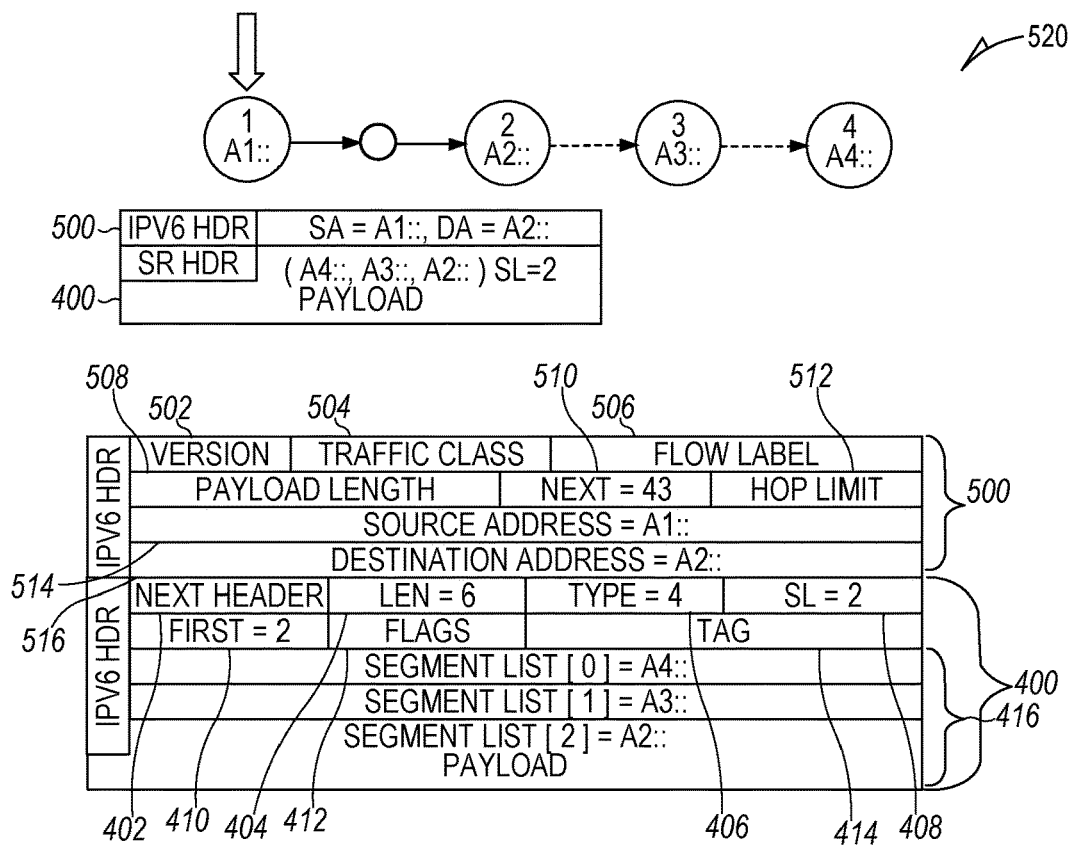
FIG. 5 illustrates an example of segment routing header (SRH) processing for a simple four node network where the source node is segment routing (SR) capable.

As illustrated in FIG. 5, the IPv6 header 500 is added to the SRv6 header 400 at the source node (1) at address A1:: of the four node network 520 including nodes (1) (A1::), (2) (A2::), (3) (A3::), and (4) (A4::). The IPv6 header 500 includes a Version field 502 identifying the version (version 6 is 0110), a Traffic Class field 504 has 6 most-significant bits including a Differentiated Services (DS) field used to classify packets, and 2 least-significant bits used for Explicit Congestion Notification (ECN) that prioritized the traffic into ranges including traffic where the source provides congestion control and non-congestion control traffic. A Flow Label field 506 provides a special service to real-time applications by hinting to routers and switches with multiple outbound paths that these packets should stay on the same path so that they will not be reordered. A Payload Length field 508 indicates the size of the payload in octets, including any extension headers. A Next Header field 510 specifies the type of the next header and usually specifies the transport layer protocol used by the packet's payload. When extension headers are present in the packet, this field indicates which extension header follows. A Hop Limit field 512 replaces the Time to Live (TTL) field of IPv4 and includes a value that is decremented by one at each forwarding node. The packet is discarded if the value in the Hop Limit field 512 becomes 0. Finally, a Source Address 514 is the IPv6 address of the sending node and a Destination Address 516 is the IPv6 address of the destination node.

In the four-node network 520 of FIG. 5, if the source node (1) is segment routing (SR) capable, the SRH 500 is created with the segment list in the reversed order of the path (A4::, A3::, A2::). Segment List [0] is the last segment and Segment List [n-1] is the first segment. The Segments Left field is set to n-1 and the First Segment is set to n-1. The IP destination address is set to the first segment, and the packet is sent according to the IP destination address using normal IPv6 forwarding.

Figure 6:
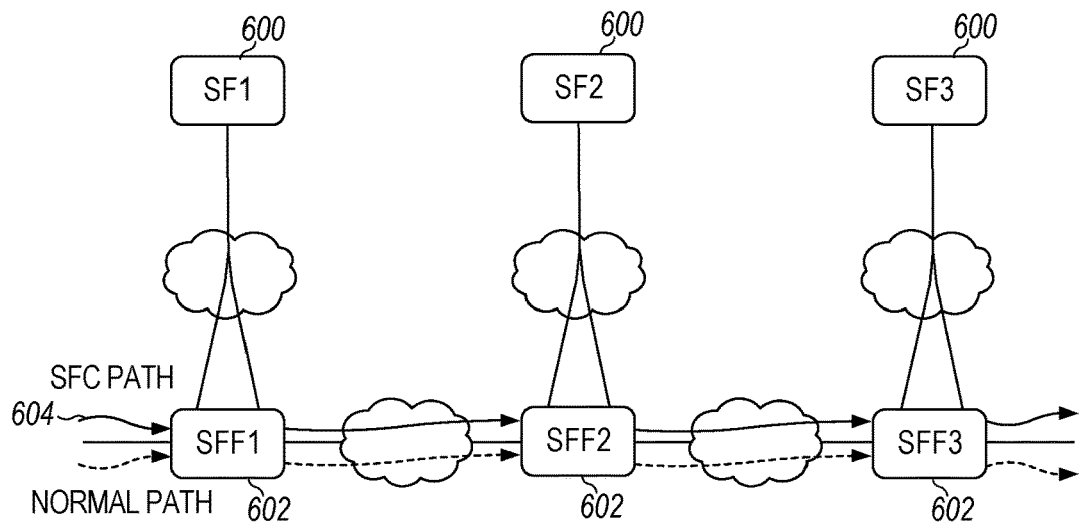
FIG. 6 illustrates Service Function Chaining (SFC) in networks as an ordered list of a network services.

As illustrated in FIG. 6, Service Function Chaining (SFC) in networks provides the ability to define an ordered list of a network services referred to as Service Functions SF1 . . . SFN 600 (e.g., firewalls, load balancers, deep packet inspection (DPI), etc.). The Service Functions are "stitched" together in the network to create a service chain SFF1 . . . SFFN (602) through the network. The Service Function Chain 602 provides the intended set of abstract service functions that must be traversed by the classified packets as they pass through the SFC path 604 and the order of traversal. The resulting SFC Path 604 provides the actual instances of services traversed or a specific instantiation of a service chain. In use, SFC provides a service overlay path between service nodes 600.

Figures 7, 8:
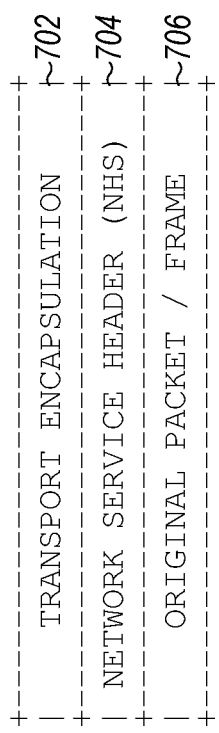
FIG. 7 illustrates the Network Service Header (NSH) encapsulation.
FIG. 8 illustrates the NSH bit allocation.

The Network Service Header (NSH) specification defines a data-plane protocol that is an encapsulation for SFCs. The NSH is designed to encapsulate an original packet or frame and, in turn, be encapsulated by an outer transport encapsulation that is used to deliver the NSH to NSH-aware network elements. The NSH also provides a mechanism for metadata exchange along the instantiated service paths. The NSH includes the following elements: 1. Service Function Path identification; 2. indication of location within a Service Function Path; and 3. optional per-packet metadata (fixed-length or variable). As illustrated in FIG. 7, the Network Service Header encapsulation 700 includes the transport encapsulation 702, the NSH 704, and the original packet/frame 706. As illustrated in FIG. 8, the NSH 704 may comprise 128-bits allocated as a base header 800, a service path header 802, and a context header(s) 804.

It is desired to accommodate the functionality of encapsulation, segment routing, SFC, and NSH without requiring significant network hardware modifications. However, to do so, several problems must be overcome. For example, in SRv6, the Segment Routing Header (SRH) is added to the original packet. In SFC, the NSH and the associated transport encapsulation header are "added" to the original packet/frame. In both cases, the size of the packet increased, which may cause the packet to exceed the underlay maximum transmission unit (MTU), which leads to fragmentation. For example, in SRv6, if a path has four segments, the added header size added to the data packet would comprise 40 bytes IPv6 encapsulation+8 bytes SRH+(16*4) bytes IPv6 SIDs=112 bytes. If there are more segments in the path, the added header will be larger. Additionally, both SFC and SRv6 cause significant security concerns mostly about privacy (the ability of an observer to look at the packets) and integrity of the path (the ability to change the packets). Also, both SFC and SRv6 require enhanced hardware support to process the new headers with minimal impact.

Embodiments of the systems and methods described herein address such problems by encoding the service/path information in unused bits of an unaltered IPv6 header using IP-in-IP encapsulation that is an IP tunneling protocol that encapsulates one IP packet in another IP packet. To encapsulate an IP packet in another IP packet, an outer header is added with the Source Address as the entry point of the tunnel and the Destination Address as the exit point of the tunnel. In the embodiments described herein, the Destination Address is used to identify an explicit path ID and service functions at the source address. Unused bits in the source and destination addresses are identified and treated as opaque containers to carry the network function encodings. Privacy and integrity of the path are obtained by the dynamic/flexible definition of the fields. In sample embodiments, a distributed or centralized control plane may be used. IGP Flooding or a software defined network (SDN)-type controller can be used to populate the state information. In use, only service-aware nodes need to maintain the path information and service functions.

In sample embodiments, a segment is defined between any two routers (one hop away or multiple hops away). As illustrated in FIG. 9, a host or ingress router encapsulates the original data packet 900 with new IPv6 header 902 that contains the path information. Then, after the segment end router receives the packet, it may execute the function defined in the encapsulation header and (as needed) forward the packet re-encapsulated using the control plane information.

All path and service function information can be programmed in the control plane using an SDN controller or populated by IGP protocols. In the encapsulation IPv6 header 500, the source address field is used to store path information, and the destination address has an encoded network service function encoded. However, it will be appreciated by those skilled in the art that the destination address field may be used to store path information and the source address field may be used to store the encoded network service function. The exact mechanism can be defined by each network and may be varied to preserve privacy and integrity of the path over time. Also, the encoding of the network functions may be dynamically defined using encodings that vary over time, by geography, and the like.

FIG. 10 illustrates the source address field 514 in the IPv6 header 500 modified to include the source address 1000 and an opaque bits field 1002 adapted to store path information and/or encode network service function information in a sample embodiment. FIG. 10 further illustrates the destination address field 516 in the IPv6 header 500 modified to include the destination address 1004 and an opaque bits field 1006 adapted to store path information and/or encode network service function information in a sample embodiment. As noted above, unused bits in the source and destination addresses (exact number of bits may vary) are treated as opaque containers defined by opaque bits fields 1002 and 1006. It is noted that the allocated 128 bits are typically not needed for a network address when encapsulation is used as the encapsulation addresses may be significantly shortened. The addresses need only identify the network part and not the host part of the addresses. Also, since the network address is unique, the host address is not required. The definition of the usage of the opaque bits is up to the user and/or the network. Different applications and/or networks may define their own sets of functions and interpretations of these opaque bits so that security and integrity of the path may be maintained.

Figure 11:
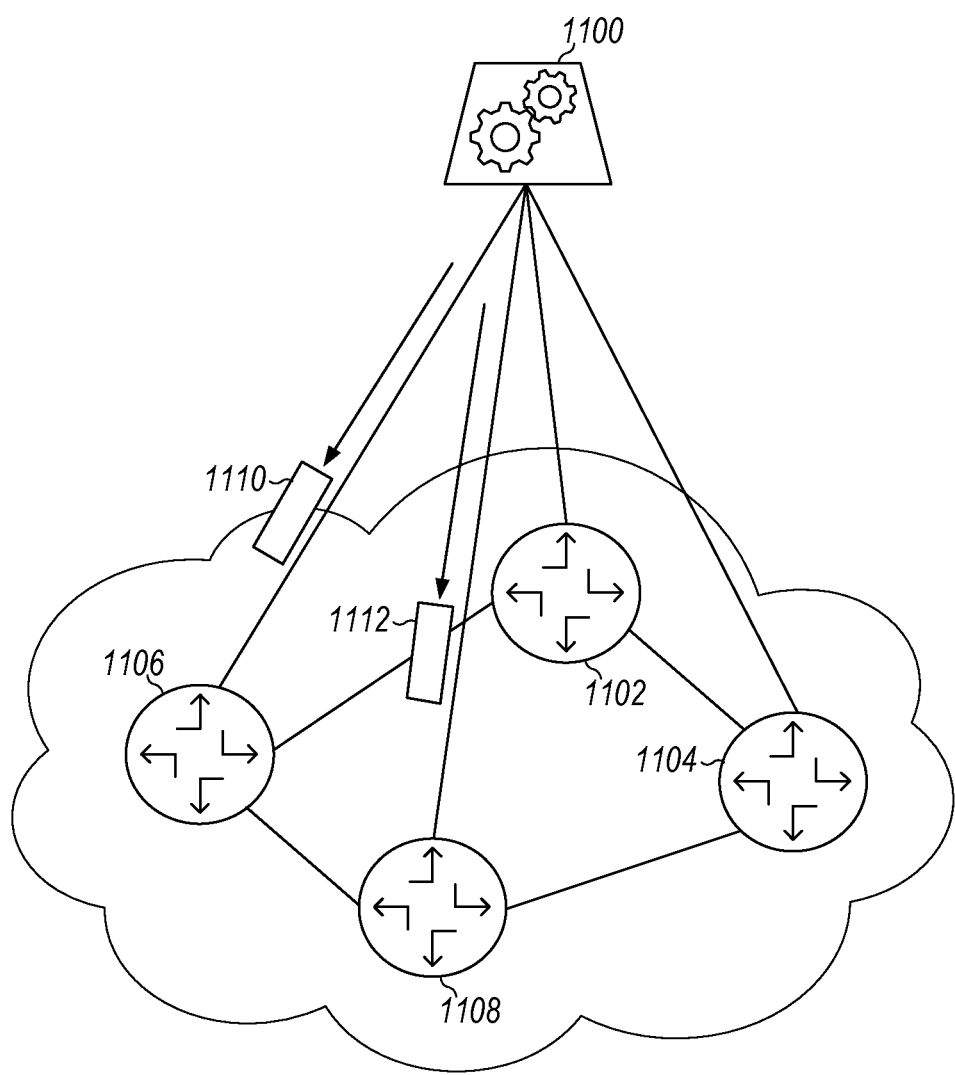
FIG. 11 illustrates use of a controller to download network function encodings/decodings and/or explicit mappings to the routers in sample embodiments.

In sample embodiments, the encodings and decodings of the opaque bit fields 1002 and 1006 are dynamic and can be changed by the control plane over time. For example, a specific encoding/decoding scheme can be used at different ranges, e.g. a network, a source, or a destination and changed at different points in time. Different triggers for the dynamic change of a particular encoding/decoding may be used, including time, traffic statistics, event, and the like. As illustrated in FIG. 11, a controller 1100 may be used to download network function encodings/decodings to the routers 1102, 1104, 1106, and 1108 and/or the controller 1100 may simply send out an explicit mapping so that the routers 1102, 1104, 1106, and 1108 can forward packets based on Forwarding Information Base (FIB) entries at each router. For example:

0x00001=use path #5
0x11000=use path #2
0x11100=use path #3 and collect statistics Thus, the controller 1100 creates the network function encoding (format, validity range, and time of use) that is to be used by the routers receiving the network function encoding. For example, a first encoding 1110 may encode using a 1-bit format that is applied to router1 1106 or all routers 1102, 1104, 1106, and 1108 in the network and is valid for a week. A second encoding 1112 may encode using a 2-bit format that is applied to router2 1112 or all routers 1102, 1104, 1106, 1108 in the network and is valid for 2 weeks, etc. The controller 1100 may download the Network Function Codes (NFCs) to the routers 1102, 1104, 1106, 1108 using different protocols for communications between the controller 1100 and the routers 1102, 1104, 1106, 1108. The routers 1102, 1104, 1106, and 1108 may prepare and/or parse packets based on the Network Function Codes (NFCs) received. For example, the routers 1102, 1104, 1106, and 1108 may encapsulate, decapsulate, and parse the packets based on the NFCs. Also, the algorithms used at each router/node to scramble or unscramble the bits field can be different to increase security. Such dynamic flexibility better insures the security and integrity of the network over time.

One encoding scenario for the opaque bits field includes an encoded path ID that is used for explicit routing. Explicit Routing means a predefined path to route packets from a source to a destination. Explicit Routing also may be referred to as Segment Routing, Preferred Path Routing, etc. However, unlike traditional routing where the routing decision is made on routers hop-by-hop based on the destination address, in Explicit Routing a path ID is used to identify an explicit path where how a packet is to be routed is specified by using a list of routers (an explicitly specified path/next-hops). The destination address in the new IPv6 header is used to identify the path id and network functions to be executed at the source address (details can be defined by the control plane).

Figure 12:
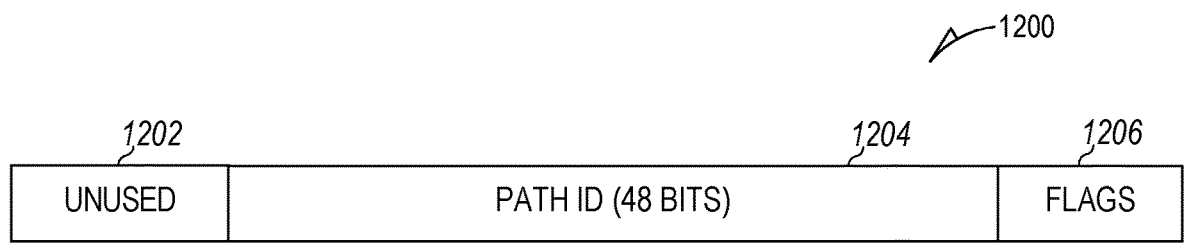
FIG. 12 illustrates a sample embodiment of the Explicit Routing Path Field including a path ID field that uniquely identifies the explicit routing path in a sample embodiment.
Figure 13:
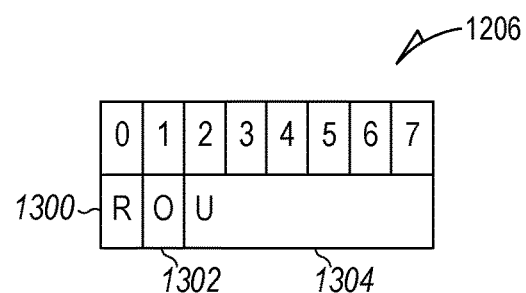
FIG. 13 illustrates the flags in the flag field of the Explicit Routing Path Field in a sample embodiment.

Referring back to FIG. 10, the network function encoding may be included in the opaque bits field 1002, while the Explicit Routing path field may be included in the opaque bits field 1006, or vice-versa. The path ID of the Explicit Routing path may be a 48-bit field that uniquely identifies the Explicit Routing path. As illustrated in FIG. 12, a sample embodiment of the Explicit Routing Path Field 1200 includes 8-bits that are Unused (1202), the 48-bit path ID field 1204, and an 8-bit flag field 1206. The path ID field 1204 may have other lengths (e.g., 32 bits or 20 bits) and uniquely identifies the explicit routing path. As illustrated in FIG. 13, the flags in the flag field 1206 may include:

R: Rerouted flag 1300 that is set when the packet has been rerouted through Fast ReRoute (FRR).

O: OAM flag 1302 that, when set, means the packet is an OAM packet.

U: Unused flags 1304 saved for future use.

As noted above, controller 1100 or Interior Gateway Protocol (IGP) can be used to pre-populate the path ID and associated path information into forwarding tables of the routers 1102 whereby the packets are forwarded based on the stored path IDs. It will be appreciated that the path ID may be a Preferred Path Routing Identifier (PPR ID) or a Non-Shortest Path Forwarding Identifier (NSPF ID) as specified in the IETF drafts relating usage of Non-Shortest Path Forwarding (NSPF). In any case, since the existing routing information is used to route the packets, no extra calculation or hardware is needed. The segment head and tail routers perform the encapsulation and decapsulation functions based on the path information. Intermediate routers (not segment head/tail) only do regular IPv6 forwarding, so no software or hardware upgrade is needed.

With the path ID, usually only one layer of encapsulation is needed to achieve explicit routing with network programmability or service chaining. This greatly mitigates the SRv6 MTU (Maximum Transmit Units) and fragmentation issue identified above.

In sample embodiments, the network functions are encoded and carried in the encapsulation header. The field of bits including the network functions should be treated as an opaque container, and the exact function encodings are defined by the control plane. Different networks may have different encodings. Even in the same network, encodings may change over time for security. Sample encodings may include the SRv6 Functions defined in Section 4 of the SRv6 specifications. Another simple way to encode the network functions is to use bit encodings where setting a bit indicates that a function corresponding to a particular bit is to be performed. For example, to use one bit for one function, if there are 64 bits available, then 64 functions can be carried at the same time. Another way is to divide these 64 bits into groups, say 4*16 bits, so for one router there can be 4 functions at a time and the function varieties are $2^{16}$.

Sample implementations illustrating the operation of a network using the Explicit Routing and network function encoding features described herein will be described with respect to FIGS. 14-17 for the common network functions that are bit encoded as ::0 decapsulate and forward and ::1 swap source address and destination address and then forward. In FIGS. 14-17, destination address represented as 50::1 means that the network node (router) at address 50 will perform network function 1, which in this example is to swap the source address and destination address and then forward the packet. On the other hand, a router having a destination address represented as 80::0 need only perform regular IPv6 forwarding without requiring any software or hardware updates.

Figure 14:
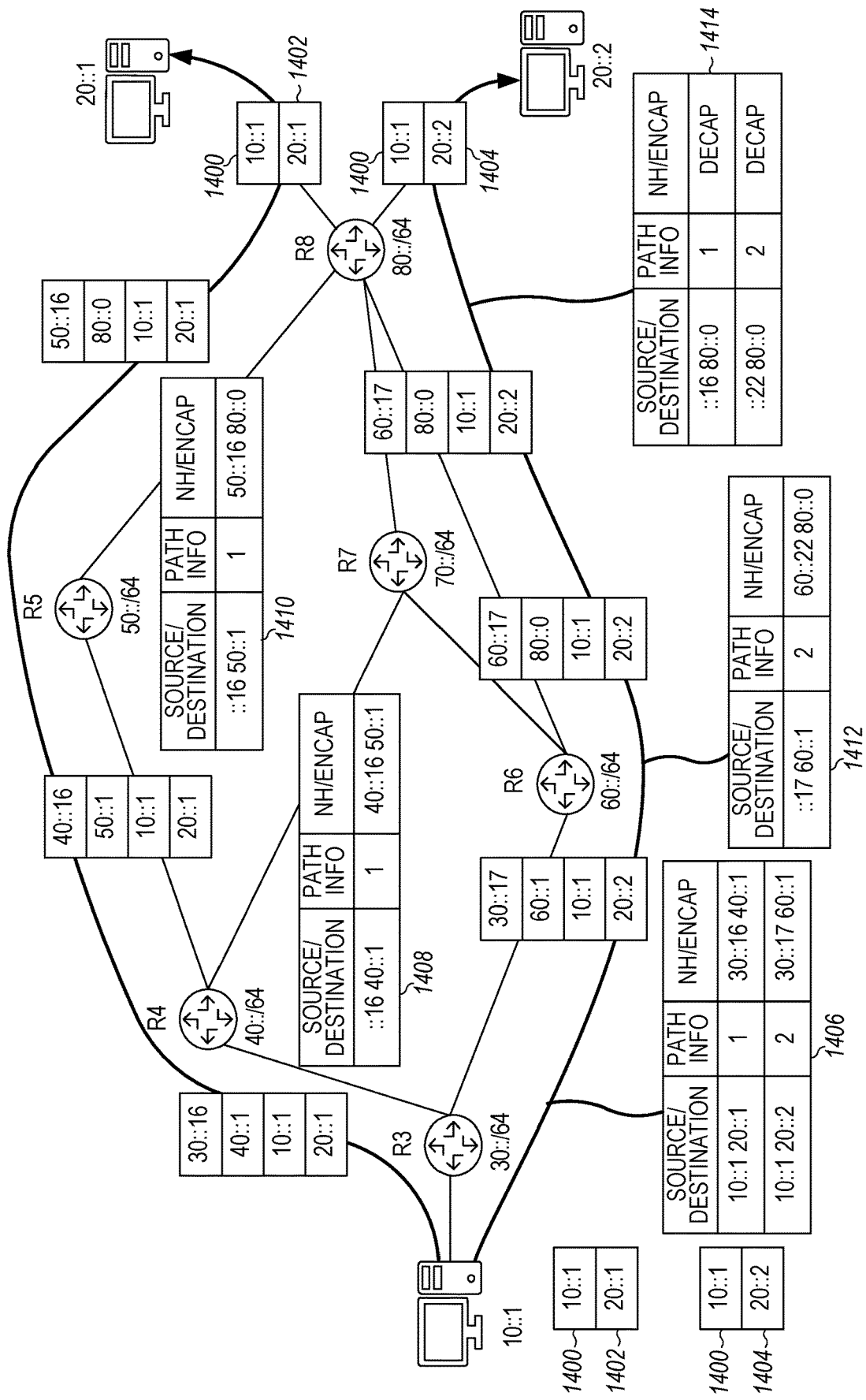
FIG. 14 illustrates a basic scenario for implementing Explicit Routing and Network Function Encoding in a sample embodiment.
Figure 15:
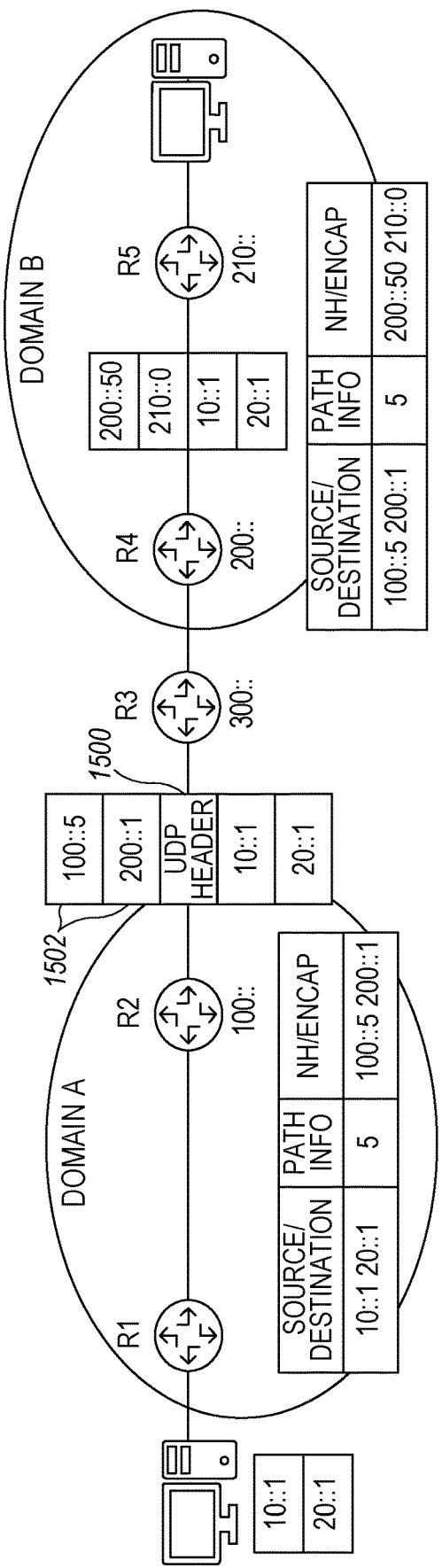
FIG. 15 illustrates a cross-domain scenario for implementing Explicit Routing and Network Function Encoding using a UDP header checksum for packet verification in a sample embodiment.

In the example of FIG. 14, source node having source address 10::1 (1400) is to send a first packet to the destination node identified as 20::1 (1402) and a second packet to the destination node identified as 20::2 (1404). At initiation, controller 1100 or Interior Gateway Protocol (IGP) flooding sends the path information identified in table 1406 to the respective routers in the network path between the source node having address 10::1 and the destination nodes identified as 20::1 and 20::2. For example, path ID 1 means to route the packet from R3 (30::16)→R4 (40::1)→R5 (50::1)→R8 (80::0), while path ID 2 means to route the packet from R3 (30::17)→R6 (60::17)→R7 (70::0)→R8 (80::0). As illustrated, table 1406 also includes the encapsulation information specifying the source address 30::16 and the destination address 40::1 for the segment from R3→R4 in path 1 and the source address 30::17 and the destination address 60::1 for the segment from R3→R6 in path 2. After the respective routers receive the path information, router local forwarding tables are updated based on the information received. For example, forwarding table at router R4 is updated to reflect the encapsulation information 1408 specifying the source address 40::16 and the destination address 50::1 for the segment from R4→R5 in path 1. R4 thus terminates one segment and updates the source address and destination address according to the forwarding table in router R4 based on the swap source address and destination address function performed at R4 (40::1). A similar process occurs in path 1 at router R5, where the encapsulation information 1410 specifying the source address 50::16 and the destination address 80::0 for the segment from R5→R8 is provided in path 1 and the source and destination addresses are swapped since that function is enabled at R5 (50::1). When the packet arrives at the network edge router R8, the network edge router R8 may decapsulate the header information due to the decapsulate network function associated with bit encoding 0 at R8 (80::0) at 1414 and an encapsulation header is added which includes path ID and function encodings based on the router's forwarding table.

On the other hand, for path 2, forwarding table at router R6 is updated to reflect the encapsulation information specifying the source address 30::17 and the destination address 60::1 for the segment from R3→R6 in path 2. R6 thus terminates one segment and updates the source address and destination address according to the forwarding table in router R6 using the encapsulation information 1406 specifying the source address 30::16 and the destination address 60::1 for the segment from R3→R6 in path 2. In path 2 at router R6, the encapsulation information 1412 specifying the source address 60::22 and the destination address 80::0 for the segment from R6→R8 is provided in path 2 as R6 performs the network function of swapping the source address and destination address. However, in this example, the path includes router R7, which is not enabled for Explicit Routing and thus simply forwards the packet using regular IPv6 forwarding. When the packet arrives at the network edge router R8, an encapsulation header is added which includes path ID and function encodings based on the router's forwarding table. Also, as with path 1, the network edge router R8 may decapsulate the header information due to the decapsulate network function associated with bit encoding 0 at R8 (80::0) (1414).

Thus, when a packet arrives at a router, if the router has upgraded to new software to include the Explicit Routing and Network Function Encoding features described herein, the router looks at the packet's destination and source address. If there are functions defined, those functions are executed (encap, decap, forward, etc.), and the packet is forwarded based on the path ID information and the forwarding table. If the router is not upgraded (as with the case of R7 in FIG. 14, the router will forward the packet just like a regular IPv6 packet. This permits incremental deployment of the software to the routers in a given network domain More generally, routers in the middle of a segment (like R7 in FIG. 14) only need to do regular IP forwarding whether or not the router has been upgraded. Finally, at the exiting routing, the encapsulation header is removed and the original packet is forwarded as normal.

In some scenarios where, for example, a segment crosses domains, a router in the path may be considered to be a security threat since it may change the encapsulation header. For example, in the cross-domain scenario in FIG. 15 where the ingress network node has a source address 10::1 in Domain A and the destination node has a destination address 20::1 in Domain B, the router R3 (300::) may be outside of either domain and hence untrusted. In this case, permitting router R3 to change the encapsulation header may be problematic as it may invite the router R3 to fraudulently change the path ID and/or the network function encoding. While the network may otherwise follow the regular encapsulation techniques between routers R1 and R2 and R4 and R5 as described above with respect to FIG. 14, a UDP header 1500 can be added at the border router R2 (100::) as illustrated in order to more safely span Domains A and B. The checksum in the UDP header is calculated based on the original packet and the new encapsulation header 1502. Thus, when the other border router R4 (200::) receives the packet, it verifies the UDP header checksum as a means to verify the integrity of the encapsulation header 1502 from router R2 in Domain A If the checksum cannot be verified, then it may be assumed that the encapsulation header may have been improperly changed and the packet is discarded. If the checksum verification passes, the UDP header 1500 is stripped off and the source address and destination address are swapped and the packet is forwarded as usual. Of course, the UDP header may also be used in intra-domain scenarios for extra security.

Figure 16:
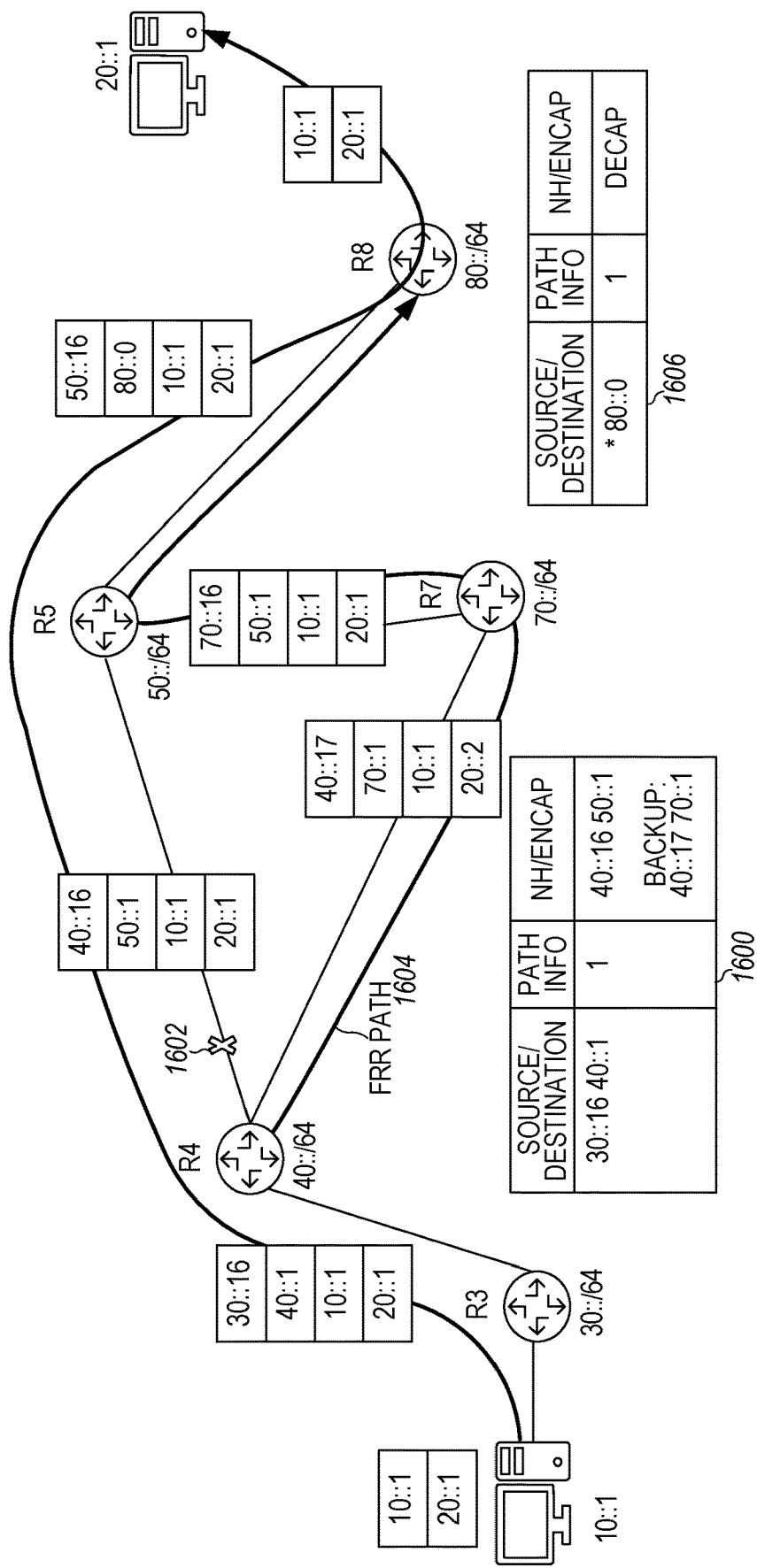
FIG. 16 illustrates a scenario where packets are rerouted using either existing Fast ReRoute (FRR) mechanisms or repair paths that are downloaded in the case of node or link failure in a sample embodiment.

FIG. 16 illustrates another scenario where packets are rerouted using either existing Fast ReRoute (FRR) mechanisms (Loop-Free Alternate (LFA), Topology Independent LFA (TI-LFA), etc.) or repair paths that are downloaded from controller 1100 or a control plane in the case of node or link failure. Once again, the network path is from the source node 10::1 to the destination node 20::1. The network follows the encapsulation techniques for forwarding the packet from router R3 to R4 as in FIG. 14, except that a backup encapsulation 1600 (40::17; 70::1) is stored in router R4. Thus, when router R4 detects a link failure to router R5 at 1602, the reroute information (maintaining the same path ID) from the backup encapsulation 1600 is included in the encapsulation at R4 and the reroute flag 1300 (FIG. 13) is set. The packet is thus rerouted over FRR path 1604 to router R7. After router R7 receives the packet, it detects the reroute flag 1300 and determines that it has received a rerouted packet. Router R7 then uses the path ID to determine the encapsulation (70::16; 50::1) to reroute the packet to router R5. Once the packet is received by router R5, the path ID is again used to determine the encapsulation (50::1; 80::0) for routing the packet to the destination router R8 (80::0), where the destination router R8 may decapsulate the header information due to the decapsulate network function associated with bit encoding 0 at R8 (80::0) at 1606.

Figure 17:
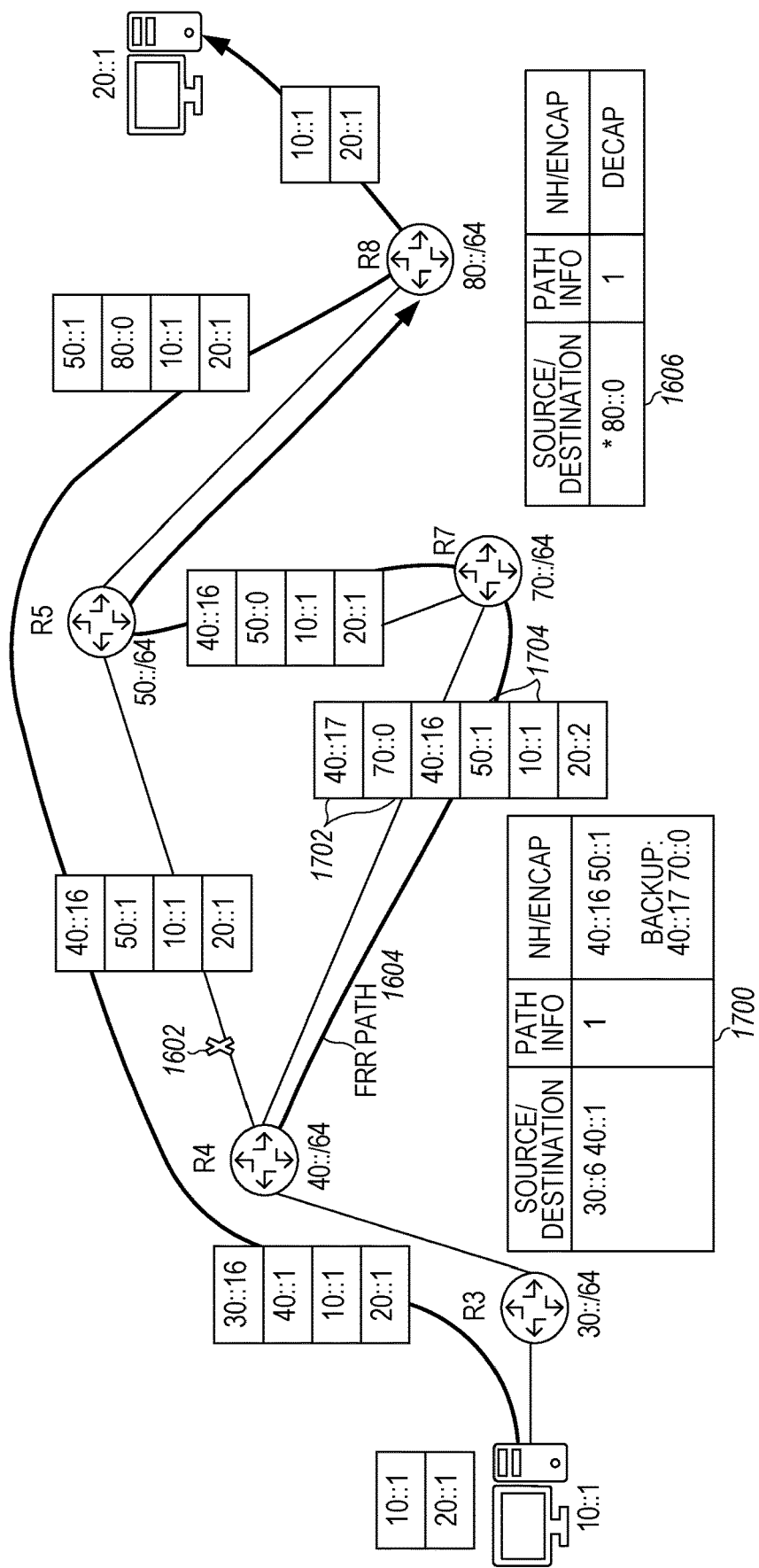
FIG. 17 illustrates another scenario where packets are rerouted using an alternative Fast ReRoute (FRR) mechanism in a sample embodiment.

FIG. 17 illustrates another scenario where packets are rerouted using an alternative Fast ReRoute (FRR) mechanism. This scenario is the same as that in FIG. 16 except that the rerouting is handled using another layer of encapsulation. In particular, when router R4 detects a link failure to router R5 at 1602, router R4 swaps the source address and the destination address in the encapsulation header according to network function 1 as usual, but router R4 then adds another layer of encapsulation for the reroute and sets the reroute flag 1300. In this case, the packet is rerouted over FRR path 1604 to router R7 according to the backup encapsulation 1700 (40::17; 70::0). Since router R7 no longer includes network function 1 and thus does not swap the source address and destination address in the encapsulation header or maintain the path information, after router R7 receives the packet, router R7 strips out the outermost layer of encapsulation 1702 and forwards the packet according to the initial encapsulation header 1704 (50:: in this case). Once the packet is received by router R5, the path ID is again used to determine the encapsulation (50::1; 80::0) for routing the packet to the destination router R8 (80::0), where the destination router R8 may decapsulate the header information due to the decapsulate network function associated with bit encoding 0 at R8 (80::0) at 1606.

Thus, in sample embodiments, when the router R4 reroutes the packet, it reroutes the packet using single encapsulation (FIG. 16) or using double encapsulation (FIG. 17) depending upon the implementation.

Numerous other scenarios may be considered using the Explicit Routing and Network Function Encoding as described herein. It will be appreciated that the network functions may be significantly more numerous, and the network path may be significantly longer but that the same techniques would apply throughout the network path. If will be further appreciated that the inventive concepts are applicable at least in a network that utilizes segment routing and/or service function chaining, as the techniques described herein can be implemented without changing hardware.

Figure 18:
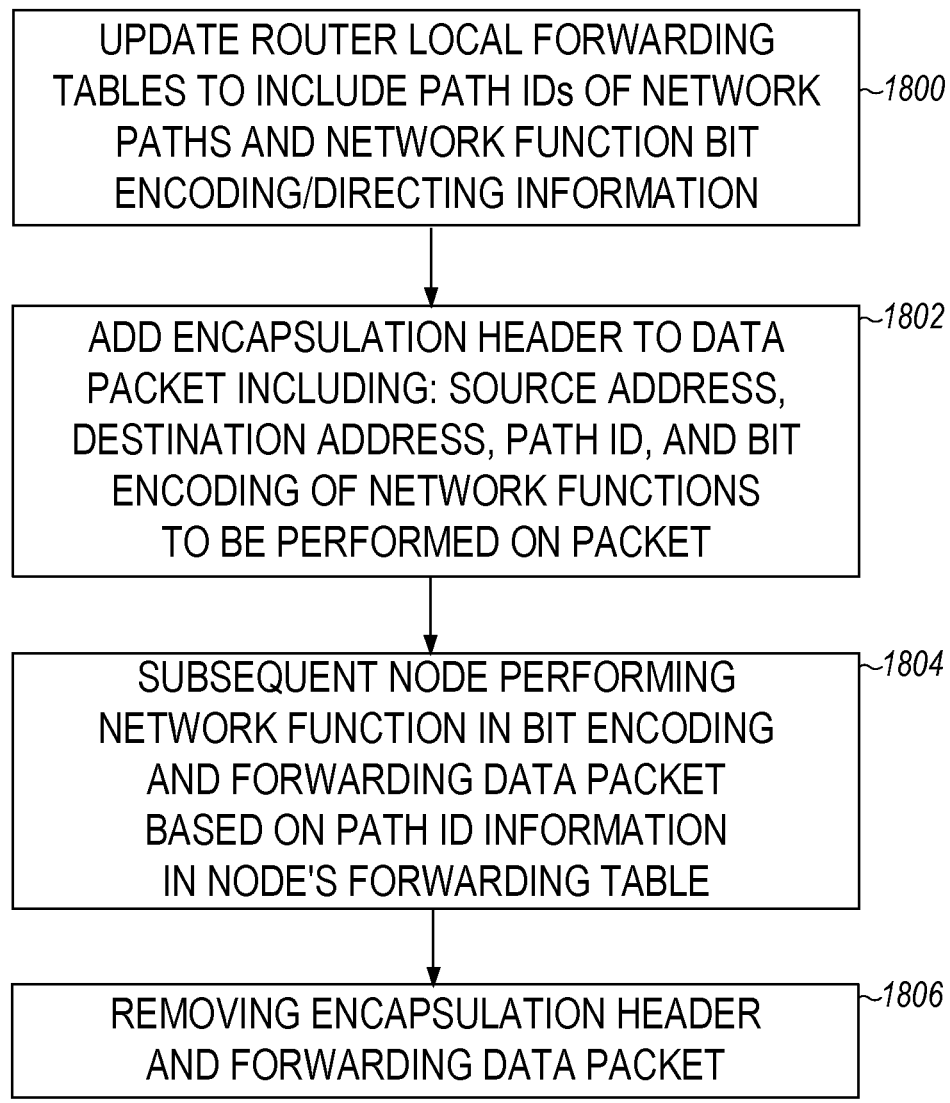
FIG. 18 illustrates a flow chart of a method of routing a data packet through a network of network nodes in a sample embodiment.

FIG. 18 illustrates a flow chart of a method of routing a data packet through a network of network nodes in a sample embodiment. As illustrated, the method includes using a controller 1100 or IGP flooding to update router local forwarding tables in the network nodes at 1800 to include path IDs of network segments defining paths between network nodes of the network and network function bit encoding/decoding information. In sample embodiments, a set network function bit indicates that a particular node is to perform the designated function for that bit. Once the network is updated, when a data packet arrives at an ingress network node of the network, an encapsulation header is added to the data packet at 1802. In sample embodiments, the encapsulation header includes a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path. In sample embodiments, the path ID of the explicit routing path and the bit encoding for the network functions to be performed on the data packet are encapsulated in unused portions of at least one of the source address and the destination address in the encapsulation header so as not to expand the size of the encapsulation header. At 1804, at least one network node in the explicit routing path performs a network function based on network function bit encoding/decoding in the source address or the destination address of the encapsulation header of the data packet and forwards the data packet based on the path ID information in the network node's local updated local forwarding table. This process is repeated through the network path defined by the path ID until the data packet arrives at an exit network node of the network. At that time, the encapsulation header is removed and the data packet is forwarded at 1806.

As noted herein, the bit encoding for the network function to be performed on the data packet is dynamically negotiated and changed between a network controller and network nodes in the network so as to maintain security. The bit encoding for the network functions may be variable for different network configurations and different user applications and may change as a function of time. The bit encoding for the network functions also may vary dependent upon the location and the traffic at a particular network node in the network. In addition, the bit encoding of the network functions may be scrambled by different algorithms at different network nodes within the network. These dynamic changes may be implemented at step 1802 as desired.

In other embodiments, the path ID uniquely identifies the explicit routing path and further contains at least one flag identifying treatment of the data packet by the network. For example, the at least one flag may include a reroute flag indicating that the data packet has been rerouted by a fast reroute mechanism or an OAM flag identifying the data packet as an operations, administration and maintenance data packet. The flags may be updated to reflect these changes as appropriate.

The techniques described herein may also enable rerouting of a data packet when a failure of a network node or a link between network nodes is detected. The data packet is rerouted by encapsulating a function and/or reroute information in the path ID and setting a reroute flag to indicate that the data packet has been rerouted. For example, a layer of encapsulation for the reroute information may be added to the encapsulation header. When a network node receives the rerouted data packet, it strips the encapsulated function and/or reroute information from the data packet and forwards the data packet according to the encapsulation header.

The techniques described herein may also provide extra security by adding a user datagram protocol (UDP) header to a data packet to provide a checksum for data integrity. The checksum in the UDP header is calculated based on the data packet and the encapsulation header, so any changes to either would cause a change in the checksum. This technique is particularly suitable for adding security when a network segment of the explicit routing path comprises a network segment that crosses domains. In this case, the network node that adds the UDP header to the data packet is typically a network node at an edge of a first domain at a first end of the network segment that crosses domains. A network node at an edge of the second domain at a second end of the network segment that crosses domains receives the data packet, verifies the UDP header checksum, and when the checksum is verified, strips off the UDP header and forwards the data packet to another network node in the second domain. However, the when the checksum is not verified, the network node at the edge of the second domain discards the data packet.

Figure 19:
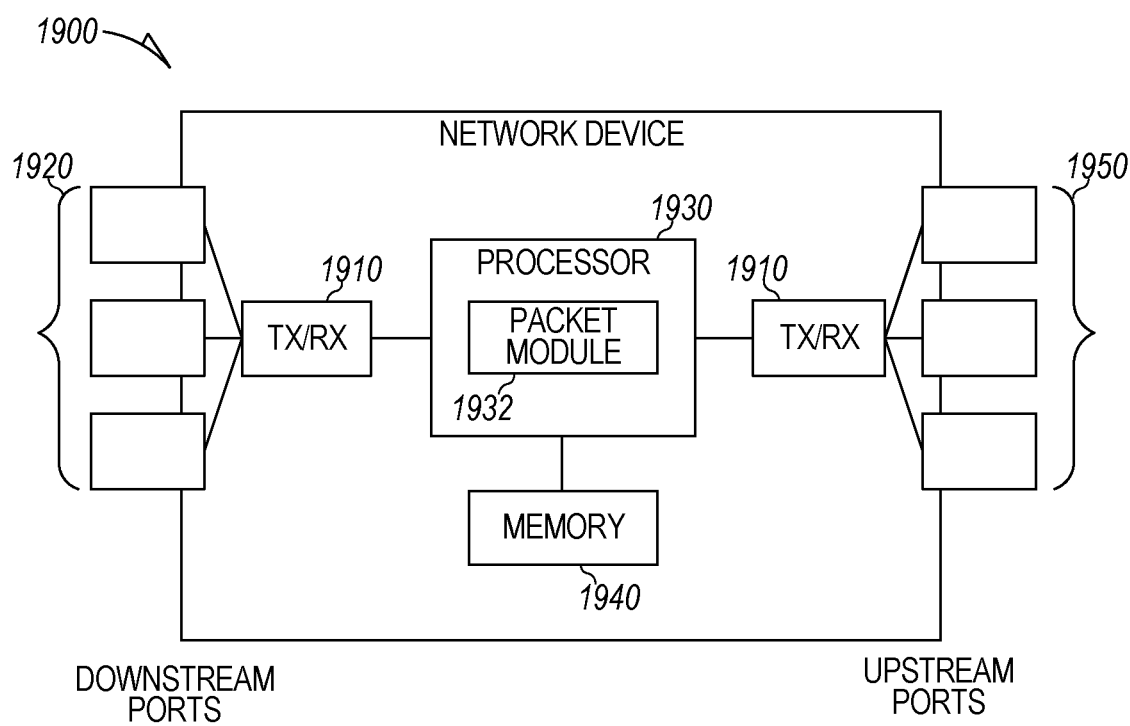
FIG. 19 is a block diagram illustrating circuitry for performing methods by a network node to process packets including encapsulation headers with Explicit Routing and Network Function Encoding according to sample embodiments.

FIG. 19 is a schematic diagram of an example network device 1900 for processing network packets including encapsulation headers including Explicit Path routing and Network Function encoding as described herein in sample embodiments. For example, network device 1900 may implement an edge node and/or an internal node in a network domain. Further, the network device 1900 can be configured to implement method the techniques described herein, particularly the method illustrated in the scenarios of FIGS. 14-17 and the software embodiment of FIG. 18. For example, the network device 1900 can transmit data packets with an encapsulation header containing Explicit Routing and Network Function encoding in opaque bits fields 1002 and 1006 of the source address and the destination address of the IPv6 header 500 described above.

Accordingly, the network device 1900 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 1900 is merely an example Network device 1900 is included for purposes of clarity of discussion but is in no way meant to limit the application of the present disclosure to a particular network device embodiment or class of network device embodiments.

The network device 1900 may be a device that communicates electrical and/or optical signals through a network, e.g., a switch, router, bridge, gateway, etc. As shown in FIG. 19, the network device 1900 may comprise transceivers (Tx/Rx) 1910, which may be transmitters, receivers, or combinations thereof. A Tx/Rx 1910 may be coupled to a plurality of downstream ports 1920 (e.g., downstream interfaces) for transmitting and/or receiving frames from other nodes and a Tx/Rx 1910 may be coupled to a plurality of upstream ports 1950 (e.g., upstream interfaces) for transmitting and/or receiving frames from other nodes, respectively. A processor 1930 may be coupled to the Tx/Rxs 1910 to process the data signals and/or determine which network nodes to send data signals to. The processor 1930 may comprise one or more multi-core processors and/or memory devices 1940, which may function as data stores, buffers, etc. Processor 1930 may be implemented as a general processor or may be part of one or more application specific integrated circuits (ASICs) and/or digital signal processors (DSPs).

The network device 1900 also may comprise a packet processing module 1932, which may be configured to receive and process encapsulated data packets as described herein. The packet processing module 1932 can process and forward the packet based on the Explicit Path routing data and/or the Network Function encoding provided in the unused portions of the source address and destination address fields of the IPv6 header as described herein. In accordance with the techniques described herein, the data packet processing may be performed based on the Network Function encoding for the network device 1900 and the packet forwarded based on the Explicit Path routing data extracted from the encapsulation header as described.

The packet processing module 1932 may be implemented in a general-purpose processor, a field programmable gate array (FPGA), an ASIC (fixed/programmable), a network processor unit (NPU), a DSP, a microcontroller, etc. In alternative embodiments, the packet processing module 1932 may be implemented in processor 1930 as instructions stored in memory device 1940 (e.g., as a computer program product), which may be executed by processor 1930, and/or implemented in part in the processor 1930 and in part in the memory device 1940. The downstream ports 1920 and/or upstream ports 1950 may contain wireless, electrical and/or optical transmitting and/or receiving components, depending on the embodiment.

Although the example computing device is illustrated and described as a network node (e.g., router), the computing device may be in different forms in different embodiments. For example, the computing device may instead be a smartphone, a tablet, smartwatch, or other computing device including the same or similar elements as illustrated and described with regard to FIG. 19. Devices, such as smartphones, tablets, and smartwatches, are generally collectively referred to as mobile devices or user equipment. Further, although the various data storage elements are illustrated as part of the network node 1900, the storage may also or alternatively include cloud-based storage accessible via a network, such as the Internet or server-based storage.

Memory 1940 may include volatile memory and/or non-volatile memory. Network node 1900 may include—or have access to a computing environment that includes—a variety of computer-readable media, such as volatile memory and non-volatile memory, removable storage devices and non-removable storage devices. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The network node 1900 may include or have access to a computing environment that includes an input interface, an output interface, and a communication interface. The output interface may include a display device, such as a touchscreen, that also may serve as an input device. The input interface may include one or more of a touchscreen, touchpad, mouse, keyboard, camera, one or more device-specific buttons, one or more sensors integrated within or coupled via wired or wireless data connections to the network node 1900, and other input devices. The network node 1900 may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks.

Computer-readable instructions stored on a computer-readable medium are executable by the processor 1930 of the network node 1900, such as the packet processing module 1932. The packet processing module 1932 in some embodiments comprises software that, when executed by the processor 1930 performs network processing and network switch operations according to the techniques described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN).

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method of routing a data packet through a network of network nodes, comprising:
updating at least one router local forwarding table to include (1) path IDs of network segments defining paths between network nodes of the network and (2) network function bit encoding/decoding information;
in response to a data packet arriving at an ingress network node of the network, adding an encapsulation header to the data packet, the encapsulation header including a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path, wherein the path ID of the explicit routing path and the bit encoding for the network functions to be performed on the data packet are encapsulated in unused portions of at least one of the source address and the destination address in the encapsulation header;
at least one network node in the explicit routing path performing a network function encoded in at least one of the source address and the destination address of the encapsulation header of the data packet and forwarding the data packet based on network function bit encoding/decoding and path ID information in the at least one network node's local updated local forwarding table; and
when the data packet arrives at an exit network node of the network, removing the encapsulation header and forwarding the data packet.

2. The method of claim 1, wherein the bit encoding for the network function to be performed on the data packet is dynamically negotiated and changed between a network controller and network nodes in the network.

3. The method of claim 1, wherein the bit encoding for the network functions is variable for different network configurations and different user applications.

4. The method of claim 1, wherein the bit encoding for the network functions changes over time.

5. The method of claim 1, wherein the bit encoding for the network functions varies dependent upon at least one of a location and traffic at a network node in the network.

6. The method of claim 1, wherein the bit encoding of the network functions is scrambled by different algorithms at different network nodes within the network.

7. The method of claim 1, wherein adding the encapsulation header to the data packet comprises storing the path ID of the explicit routing path in unused portions of the network node destination address and storing the network function bit encoding/decoding information in unused portions of the network node source address.

8. The method of claim 1, wherein the path ID uniquely identifies the explicit routing path and further contains at least one flag identifying treatment of the data packet by the network.

9. The method of claim 8, wherein the at least one flag comprises a reroute flag indicating that the data packet has been rerouted by a fast reroute mechanism and an OAM flag identifying the data packet as an operations, administration and maintenance data packet.

10. The method of claim 8, further comprising detecting a failure of at least one of a network node and a link between network nodes, rerouting the data packet by encapsulating at least one of function and reroute information in the path ID, and setting a reroute flag to indicate that the data packet has been rerouted.

11. The method of claim 10, wherein rerouting the data packet by encapsulating at least one of function and reroute information in the path ID comprises adding a layer of encapsulation for the reroute information to the encapsulation header.

12. The method of claim 11, further comprising a network node receiving the rerouted data packet stripping the encapsulated at least one of function and reroute information from the data packet and forwarding the data packet according to the encapsulation header.

13. The method of claim 1, further comprising a network node adding a user datagram protocol (UDP) header to a data packet to provide a checksum for data integrity, wherein the checksum in the UDP header is calculated based on the data packet and the encapsulation header.

14. The method of claim 13, wherein the at least one network segment of the explicit routing path comprises a network segment that crosses domains, wherein the network node that adds the UDP header to the data packet comprises a network node at an edge of a first domain at a first end of the network segment that crosses domains.

15. The method of claim 14, wherein the network segment that crosses domains further comprises a network node at an edge of a second domain at second end of the network segment that crosses domains, further comprising the network node at the edge of the second domain receiving the data packet, verifying the UDP header checksum, and when the checksum is verified, stripping off the UDP header and forwarding the data packet to another network node in the second domain.

16. The method of claim 15, further comprising the network node at the edge of the second domain discarding the data packet when the checksum is not verified.

17. A network node that routes a data packet through a network of network nodes, comprising:
- at least one transceiver that transmits and receives data packets;
- a forwarding table comprising path ID information for network segments through the network;
- a non-transitory memory element comprising instructions; and
- one or more processors in communication with the at least one transceiver to receive data packets for processing and to the memory to receive instructions for processing the data packets, wherein the one or more processors execute the instructions to:
  - extract an encapsulation header from the data packet, the encapsulation header including a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path;
  - extract the path ID of the explicit routing path and the bit encoding for the network functions to be performed on the data packet from unused portions of at least one of the source address and the destination address in the encapsulation header; and
  - when the bit encoding indicates a network function that the network node is programmed to perform, the network node performing a network function based on the network function bit encoding/decoding encoded in the encapsulation header of the data packet and forwarding the data packet based on path ID information in the network node's forwarding table.

18. The network node of claim 17, wherein the at least one processor executes instructions to dynamically negotiate with a network controller to establish the bit encoding for the network functions to be performed on the data packet by the network node.

19. The network node of claim 17, wherein the at least one processor executes instructions to reroute the data packet by encapsulating at least one of function and reroute information in the path ID and setting a reroute flag to indicate that the data packet has been rerouted upon receipt of an indication that at least one of a network node and a link between network nodes has failed.

20. A non-transitory computer-readable media storing computer instructions for routing a data packet through a network of network nodes, that when executed by one or more processors of a network node cause the one or more processors to:
- extract an encapsulation header from the data packet, the encapsulation header including a network node source address, a network node destination address, a path ID identifying at least one network segment of an explicit routing path the data packet is to traverse from the source address to the destination address, and a bit encoding specifying network functions to be performed on the data packet by one or more network nodes in the explicit routing path;
- extract the path ID of the explicit routing path and the bit encoding for the network functions to be performed on the data packet from unused portions of at least one of the source address and the destination address in the encapsulation header; and
- when the bit encoding indicates a network function that the network node is programmed to perform, performing a network function based on the network function bit encoding/decoding encoded in the encapsulation header of the data packet and forwarding the data packet based on path ID information in a forwarding table of the network node.

* * * * *